(12) United States Patent
Hemphill et al.

(10) Patent No.: US 12,448,334 B2
(45) Date of Patent: Oct. 21, 2025

(54) HIGH TEMPERATURE SAG RESISTANT GYPSUM PANEL

(71) Applicant: KNAUF GIPS KG, Iphofen (DE)

(72) Inventors: Mark K. Hemphill, Hawthorn Woods, IL (US); Qinghua Li, Rolling Meadows, IL (US); Aaron D. Johnson, Antioch, IL (US)

(73) Assignee: KNAUF GIPS KG, Iphofen (DE)

( * ) Notice: Subject to any disclaimer, the term of this patent is extended or adjusted under 35 U.S.C. 154(b) by 520 days.

(21) Appl. No.: 17/865,747

(22) Filed: Jul. 15, 2022

(65) Prior Publication Data

US 2023/0045576 A1   Feb. 9, 2023

Related U.S. Application Data

(60) Provisional application No. 63/225,252, filed on Jul. 23, 2021.

(51) Int. Cl.
| | |
|---|---|
| *C04B 28/14* | (2006.01) |
| *B28B 19/00* | (2006.01) |
| *B32B 5/18* | (2006.01) |
| *C04B 14/46* | (2006.01) |
| *B32B 17/06* | (2006.01) |

(Continued)

(52) U.S. Cl.
CPC .......... *C04B 28/14* (2013.01); *B28B 19/0092* (2013.01); *B32B 5/18* (2013.01); *C04B 14/46* (2013.01); *B32B 17/066* (2013.01); *B32B 29/007* (2013.01); *B32B 2266/053* (2016.11); *B32B 2307/3065* (2013.01); *B32B 2307/72* (2013.01); *B32B 2315/08* (2013.01); *B32B 2315/18* (2013.01); *B32B 2607/00* (2013.01); *C04B 2111/0062* (2013.01); *C04B 2111/28* (2013.01); *C04B 2111/34* (2013.01); *C04B 2201/20* (2013.01)

(58) Field of Classification Search
None
See application file for complete search history.

(56) References Cited

U.S. PATENT DOCUMENTS

| | | | |
|---|---|---|---|
| 2,078,199 A | | 4/1937 | King |
| 2,526,066 A | * | 10/1950 | Croce ............... E04C 2/043 |
| | | | 106/782 |

(Continued)

FOREIGN PATENT DOCUMENTS

| | | |
|---|---|---|
| CN | 110078456 A | 8/2019 |
| EP | 2045227 A1 | 4/2009 |

(Continued)

OTHER PUBLICATIONS

"Rock Wool, Stone Wool, Mineral Wool, & Slag Wool Building Insulation Identification," https://inspectapedia.com/insulation/Rock_Wool_Insulation.php (Year: 2019).*

(Continued)

*Primary Examiner* — David Sample
(74) *Attorney, Agent, or Firm* — Greer, Burns & Crain, Ltd; Philip T. Petti; Pradip Sahu

(57) ABSTRACT

A fire-resistant gypsum panel comprises: a gypsum core layer comprising set gypsum and a high temperature sag-resistant material including mineral wool in an amount between 0.2% and 3.0% by weight of gypsum.

28 Claims, 1 Drawing Sheet

(51) Int. Cl.
  *B32B 29/00* (2006.01)
  *C04B 111/00* (2006.01)
  *C04B 111/28* (2006.01)
  *C04B 111/34* (2006.01)

(56) References Cited

U.S. PATENT DOCUMENTS

| | | |
|---|---|---|
| 3,376,147 A | 4/1968 | Dean |
| 3,462,341 A | 8/1969 | Littin |
| 3,573,947 A | 4/1971 | Kinkade et al. |
| 3,616,173 A | 10/1971 | Green et al. |
| 4,557,973 A * | 12/1985 | Ali .............. C04B 24/12 156/39 |
| 4,647,486 A | 3/1987 | Ali |
| 4,676,835 A | 6/1987 | Green et al. |
| 5,155,959 A | 10/1992 | Richards et al. |
| 5,158,612 A | 10/1992 | Savoly et al. |
| 5,240,639 A | 8/1993 | Diez et al. |
| 5,601,888 A | 2/1997 | Fowler |
| 5,643,510 A | 7/1997 | Sucech et al. |
| 5,683,635 A | 11/1997 | Sucech et al. |
| 6,342,284 B1 | 1/2002 | Yu et al. |
| 6,409,825 B1 | 6/2002 | Yu et al. |
| 6,494,609 B1 | 12/2002 | Wittbold et al. |
| 6,632,550 B1 | 10/2003 | Yu et al. |
| 6,815,049 B2 | 11/2004 | Veeramasuneni et al. |
| 6,822,033 B2 | 11/2004 | Yu et al. |
| 7,364,676 B2 | 4/2008 | Sucech et al. |
| 7,851,057 B2 | 12/2010 | Englert et al. |
| 8,323,785 B2 | 12/2012 | Yu et al. |
| 10,421,250 B2 | 9/2019 | Li et al. |
| 10,421,251 B2 | 9/2019 | Li et al. |
| 11,040,513 B2 | 6/2021 | Li et al. |
| 2006/0278128 A1 | 12/2006 | Liu et al. |
| 2010/0247937 A1 | 9/2010 | Liu et al. |
| 2012/0219785 A1 * | 8/2012 | Yu .............. B28B 11/12 428/312.4 |
| 2014/0113124 A1 | 4/2014 | Sang et al. |
| 2015/0010767 A1 | 1/2015 | Sang et al. |
| 2016/0376191 A1 | 12/2016 | Li et al. |
| 2018/0009129 A1 | 1/2018 | Whittington et al. |

FOREIGN PATENT DOCUMENTS

| | | | |
|---|---|---|---|
| ES | 2561730 A1 | 2/2016 | |
| JP | S57-196753 A | 12/1982 | |
| KR | 2008105776 A * | 12/2008 | .......... C04B 14/041 |
| WO | 95/16515 A1 | 6/1995 | |
| WO | 2008045217 A2 | 4/2008 | |
| WO | 2020256980 A1 | 12/2020 | |
| WO | 2021104602 A1 | 6/2021 | |

OTHER PUBLICATIONS

International Search Report and Written Opinion received for PCT/IB2022/056642 mailed Nov. 3, 2022.

Kazuo, S., et al., "Inorganic building materials with high nonflammability and small shrinkage," Chemical Abstracts, vol. 98, No. 22, 184631J, May 30, 1983, p. 312.

Piñeiro, S., et al., "New Plaster Composite with Mineral Wool Fibres from CDW Recycling" Advances in Materials Science and Engineering, vol. 2015, Jan. 2015, Article ID: 854192, 9 pages.

* cited by examiner

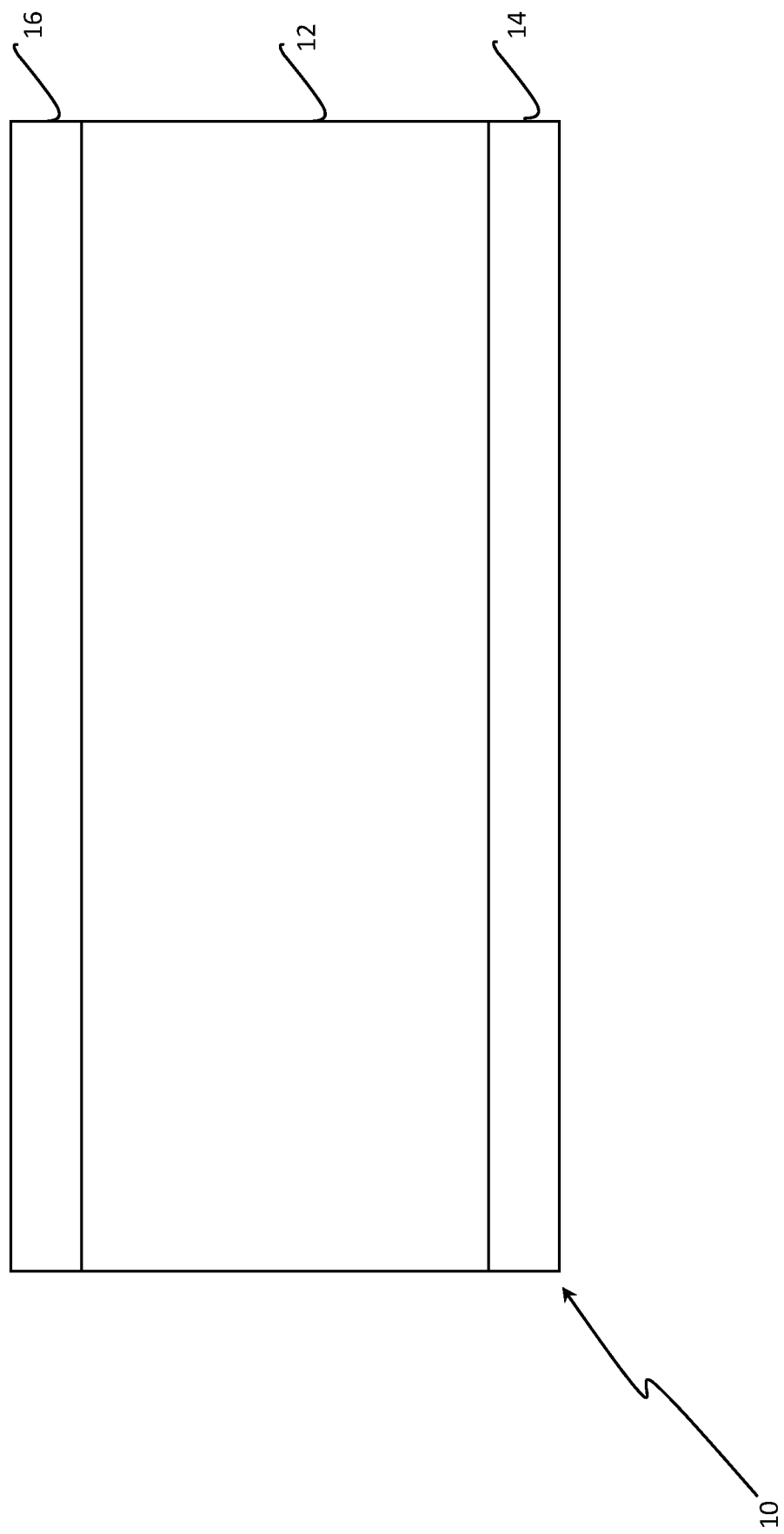

HIGH TEMPERATURE SAG RESISTANT GYPSUM PANEL

REFERENCE TO RELATED APPLICATIONS

The present application claims priority to U.S. Provisional Application Ser. No. 63/225,252, filed Jul. 23, 2021, entitled HIGH TEMPERATURE SAG RESISTANT GYPSUM PANEL. U.S. Provisional Application Ser. No. 63/225,252 is incorporated by reference in its entirety herein.

FIELD

The present disclosure relates to gypsum structures. More specifically, the present disclosure relates to gypsum panels having fire resistant and high temperature sag resistant properties, and methods for making same.

BACKGROUND

Gypsum (calcium sulfate dihydrate) panels are well-known building products. They are used primarily as an interior wall and ceiling product, but also to a certain extent as an exterior product.

To prepare gypsum panels, a slurry including calcium sulfate hemihydrate (stucco or calcined gypsum), water, and other ingredients is combined, e.g., in a mixer. The slurry, when set, forms a gypsum core.

The slurry may be continuously deposited on a cover sheet (e.g., paper) moving continuously on a wallboard manufacturing line. A second (e.g., paper) cover sheet may be applied thereover, and the resultant assembly is formed into a desired shape. The calcium sulfate hemihydrate reacts with sufficient water to convert the hemihydrate stucco into a matrix of interlocking calcium sulfate dihydrate crystals, causing it to set and to become firm. The continuous strip or ribbon thus formed may be conveyed on a belt until the calcined gypsum is set. The strip may be cut to form panels, e.g., boards, of desired length. The boards may be conveyed through a drying kiln to remove excess moisture.

The chemically combined water in the dihydrate crystal contributes to the fire-retardant properties of fire-resistant gypsum panels. When exposed to sufficient heat, e.g., from high temperature gases or fire (flames), dihydrate is recalcined, e.g., converted back into the hemihydrate or even the anhydrite forms. Excess water of hydration is driven off in the form of steam. As the steam is released, heat transmission through the panel is reduced as the heat energy from the fire is used to drive the dehydration reactions and to vaporize the water.

The gypsum panel thus provides a fire-resistant barrier. Thicker gypsum panels provide more fire resistance than thinner ones as it takes longer for the heat to penetrate the entire thickness of the panel to drive off the water. Example fire-resistant gypsum panels include but are not limited to wallboards and ceiling boards.

The loss of the water normally leads to shrinkage of the panel. The gypsum panels may become very brittle and lose their strength and integrity under the fire. Large cracks can form in the gypsum panel due to the shrinkage. Shrinkage also causes enlargement of openings between the panels at the edge joints. Enlargement of the edge joint, large cracks, and other openings allows accelerated transmission of heat and hot gasses through the wall and can also allow a fire to reach wood studs behind the gypsum panels to further fuel the fire.

Introduction of certain fibers, ores, and/or inorganic particles into the gypsum core can improve the fire-resistant properties of gypsum panels. For instance, glass fibers may be added to the core composition. The use of glass fibers to maintain the panel strength and integrity is disclosed, for example, in U.S. Pat. No. 4,647,486. Distribution of glass fibers in wallboard with increased edge concentration is described in U.S. Pat. No. 3,462,341.

Introduction of expandable material such as intumescent material into the gypsum core of a panel can be used to improve the fire resistance of gypsum panels. As the panel heats up in the presence of the fire, intumescent materials expand to at least partially take the place of the water being displaced. It takes much longer for the board to burn through or form large cracks compared to non-expanding gypsum core.

Addition of perlite and/or vermiculite to wallboard for fire resistance is well known in the art. For instance, U.S. Pat. No. 3,376,147 discloses the addition of perlite and vermiculite to gypsum board. The '147 Patent discloses that these materials are intumescent and will expand when exposed to a fire. U.S. Pat. No. 5,601,888 teaches manufacture of a gypsum composition combining gypsum, paper fibers and one or more performance boosters, such as inorganic fibers, clays, vermiculites, and polymer binders.

Wall or floor/ceiling assembly fire tests can measure the time it takes for a system to reach certain limiting criteria, e.g., as set out in the ASTM (the American Society for Testing and Materials) E119 Test Procedure. For a wall assembly, for instance, limiting criteria can be defined as passage of heat energy through the wall, exceeding of a prescribed temperature rise on the unexposed face of the wall, the ability of the wall to carry a superimposed design load during the fire (for load-bearing walls), or projection of water through the assembly. Various assemblies can be tested in accordance with ASTM E119, such as Underwriters Laboratories (UL) assemblies U305, U419, and U423.

Fire-resistant gypsum panels containing glass fiber as well as minerals that expand in the presence of heat can at least partially compensate for panel shrinkage resulting from the dehydration and melting of the gypsum. This helps add stability to the gypsum core, significantly enhancing the panel's fire-resistant performance.

However, the present inventors have recognized that while glass fiber reduces the extent and severity of cracks in the panel when the panel is exposed to flame and heat, the glass fiber loses its strength with an increase of the temperature. When the temperature goes up to over 1100 F, for instance, the glass fiber loses over 80% of strength. This can cause fire-resistant boards that include glass fiber to severely sag or even fall down before the specified failure time in some fire tests.

Further, exposure to sufficiently high temperatures may result in phase changes in the anhydrite of the gypsum core and rearrangement of the crystalline structures in the gypsum core. Impurities in the boards such as salts can reduce the melting point of the crystal structures.

SUMMARY

There is a need in the art for gypsum panels with improved fire resistance that are also resistant to sag at high temperatures. There is also a need in the art for high-salt gypsum panels with improved fire resistance and high-temperature sag resistance.

According to one aspect of the disclosed embodiments, a fire-resistant gypsum panel comprises: a gypsum core layer comprising set gypsum and a high temperature sag-resistant material including mineral wool in an amount between 0.2% and 3.0% by weight of stucco.

In some embodiments the fire-resistant gypsum panel further comprises a facing material.

In some embodiments the fire-resistant panel further comprises one or more shrinkage-resistant materials.

In some embodiments the gypsum core layer further comprises a strength-enhancing agent.

In some embodiments the fire-resistant gypsum panel has a high temperature sag reduction of at least 10% compared to a gypsum panel that includes glass fiber in place of the high temperature sag-resistant material but is otherwise configured the same or similarly.

In some embodiments the gypsum core layer does not include glass fiber.

In some embodiments the fire-resistant gypsum panel further comprises a densified layer disposed between the gypsum core and a facing material on at least one long surface of the gypsum core layer.

According to yet another aspect of the disclosed embodiments, a set gypsum core comprises: set gypsum; and a high temperature sag-resistant material including mineral wool in an amount between 0.2% and 3.0% by weight of the stucco.

In some embodiments the set gypsum core further comprises one or more shrinkage-resistant materials.

In some embodiments the set gypsum core further comprises a strength-enhancing agent.

In some embodiments the set gypsum core does not include glass fiber.

According to yet another aspect of the disclosed embodiments, a composition for forming a fire-resistant gypsum core comprises: water; stucco; and a high temperature sag-resistant material including mineral wool in an amount between 0.2% and 3.0% by weight of the stucco.

In some embodiments, the composition further comprises one or more shrinkage-resistant materials.

In some embodiments the composition further comprises a sagging-resistant material.

In some embodiments the composition does not include glass fiber.

According to yet another aspect of the disclosed embodiments, a method for making a fire-resistant gypsum panel comprises: preparing a slurry comprising water, stucco, and a high temperature sag-resistant material including mineral wool in an amount between 0.2% and 3.0% by weight of the stucco; combining the prepared slurry with aqueous foam to provide an air-foamed slurry; forming a gypsum core from the air-foamed slurry; allowing the formed gypsum core to set; and drying the set gypsum core.

In some embodiments the slurry further comprises one or more shrinkage-resistant materials.

In some embodiments the slurry further comprises a strength-enhancing agent.

Other features and advantages of the invention will be apparent from the following specification taken in conjunction with the following figure.

BRIEF DESCRIPTION OF THE DRAWING

The present disclosure will become more fully understood from the detailed description and the accompanying figure, wherein:

FIG. 1 is an example gypsum panel according to an embodiment of the present disclosure.

DETAILED DESCRIPTION

While this invention is susceptible of embodiments in many different forms, there is shown in the drawing and will herein be described in detail preferred embodiments of the invention with the understanding that the present disclosure is to be considered as an exemplification of the principles of the invention and is not intended to limit the broad aspects of the invention to the embodiments illustrated.

Unless otherwise noted, concentrations used in this description refer to percentages by weight based on the dry weight of stucco (calcium sulfate hemihydrate).

Embodiments disclosed herein provide, among other things, a fire-resistant gypsum panel, including a gypsum core layer comprising set gypsum and a high temperature sag-resistant material including mineral wool in an amount of between 0.2% and 3.0% by weight of the stucco.

Mineral wool is a material that is stable at high temperature. It does not melt at a temperature lower than 2000 F. In example fire-resistant gypsum panels provided herein, mineral wool is included as a glass fiber replacement. In some embodiments, glass fiber may be omitted from the gypsum core layer.

In some embodiments, fire-resistant gypsum panels having a high salt concentration (e.g., a chloride level of 300 ppm or more) and including mineral wool in place of glass fiber are provided.

Experiments confirmed that the use of mineral wool as a glass fiber replacement in both high salt and lower salt fire-resistant gypsum panels provided good thermal performance, reducing thermal shrinkage and high temperature sag.

For instance, the fire-resistant gypsum panel may have a high temperature sag reduction (in sag depth) of at least 10% (or at least about 10%), for instance between 10% (or about 10%) and 75% (or about 75%) compared to a gypsum panel that includes glass fiber in place of the high temperature sag-resistant material but is otherwise configured the same, essentially the same, or similarly. In other words, by replacing glass fiber in an example fire-resistant gypsum panel with high temperature sag-resistant material, high temperature sag (in sag depth) can be reduced, for example, between 10% and 75%.

Turning now to the drawing, a multilayer fire-resistant gypsum panel, generally 10, includes a gypsum cementitious core (gypsum core) 12 and optionally front and back facing material such as cover sheets 14, 16. Inclusion of additional layers or coverings with this panel 10, or omission of either facing material 14, 16 is contemplated. The gypsum panel 10 includes opposing faces and opposing edges.

During the manufacture of example gypsum panels, a continuous strip of the core 12 material can be produced that is cut to form individual panels. Panels may include boards, such as but not limited to wallboards and ceiling boards. Reference herein to features of any one of structures including panels, boards, wallboards, or ceiling boards are intended to be likewise applicable to features of the other structures, except where explicitly indicated otherwise.

In the gypsum panel 10 of FIG. 1, the cover sheets 14, 16 are shown as being applied directly over the cementitious core 12. In other embodiments, a gypsum panel comprising a cementitious core covered with a cover sheet may further comprise additional layer(s), coating(s), and/or component(s) located between the cover sheets 14, 16, and a gypsum core 12 and/or such additional layer(s), coating(s) and/or component(s) may be applied over the external surface of the cover sheet. An example additional layer or layers disposed between the cementitious core 12 and one or more cover sheets 14, 16 can be embodied in a densified layer.

The cementitious core 12 includes gypsum, also known as landplaster, terra alba, or calcium sulfate dihydrate, and can be referred to as a gypsum core. Gypsum cores according to embodiments are made from a gypsum slurry that includes calcium sulfate hemihydrate, a high temperature sag-resistant material including mineral wool, other optional ingredients, and water. Example gypsum cores provided herein can have improved fire-resistant properties relative to conventional products, and can have a relatively low density, while still exhibiting sufficient strength for use as a structural material for ceilings or surfaces such as walls.

Gypsum is made into the panel 10 by adding water to stucco, also known as plaster of Paris, calcined gypsum, or calcium sulfate hemihydrate, to form the slurry. The calcium sulfate hemihydrate is hydrated with water to form an interlocking matrix of calcium sulfate dihydrate crystals. Calcined gypsum including calcium sulfate hemihydrate, calcium sulfate anhydrite, or both can be used in example slurries.

Calcium sulfate hemihydrate can produce at least two common crystal forms, the alpha and beta forms. Beta calcium sulfate hem ihydrate is commonly used in gypsum board panels, but it is also contemplated that panels made of alpha calcium sulfate hemihydrate or mixtures of alpha and beta hemihydrate could be used. Beta-calcined stucco is provided as a preferred calcium sulfate hem ihydrate in some example slurries. In some embodiments, anhydrite gypsum is also contemplated for use as a minor component of calcined gypsum, for instance in amounts of less than 20% by weight of the calcined gypsum content in the slurry.

Gypsum composites can vary in their silica content and the amount and types of soluble salts that are present in the deposits. These deposits are not generally removed prior to calcining and may therefore be present in the calcium sulfate hem ihydrate.

For instance, the presence of certain low melting point soluble salts, such as chlorides, reduces the melting point of the gypsum composite and can result in significant high-temperature shrinkage. Melting-down of the gypsum composite has been confirmed by SEM examination. A high soluble salt content in the gypsum composite lowers the melting point and increases the shrinkage of the gypsum.

In some embodiments provided herein, a soluble salt content of the gypsum core is less than 300 ppm by weight of gypsum. In other embodiments, referred to herein as high-salt gypsum cores and high-salt gypsum panels, a soluble salt content of the gypsum core is greater than 300 ppm by weight of gypsum.

Example silica materials in the gypsum composite may include clay minerals such as kaolin clay. Stuccos having a high silica content in the gypsum composite increase the melting point, which is preferred for better fire resistance. An example of a high silica calcium sulfate hemihydrate is more than 1% silica or more than 2% clay content by weight.

In some embodiments, the gypsum core includes at least 50% stucco (e.g., calcium sulfate hemihydrate) by weight of the dry components. In some embodiments, the gypsum core can include at least 60% stucco (e.g., calcium sulfate hemihydrate) and even more preferably from 70-99% by weight. In some embodiments, the amount of stucco in the gypsum core is from about 70 to about 90 wt% based on the weight of the dry solids.

To prolong structural integrity of the panel 10 during a fire, the gypsum core further includes a high temperature sag-resistant material including a mineral wool. The mineral wool may be included alone or in addition to other sag-resistant materials to provide the high temperature, sag-resistant material. The high temperature sag-resistant material is used in amounts of 0.2% and 3.0% by weight of the stucco, and in some embodiments is used in amounts of 0.2% to about 1.0% by weight based on the stucco. Such high temperature sag-resistant materials help to hold the panel 10 together in a fire.

Conventional fire rated gypsum panels (e.g., boards) contain additives such as chopped glass fiber that are incorporated into the gypsum core. When exposed to fire and after both facing papers are burned off, it is believed that these additives serve to bridge the gypsum crystals and reduce the size of cracks that form as the panel's water is converted to steam. This prolongs the integrity of the gypsum panel, allowing it to continue to act as a fire barrier and thus retard the passage of heat through, for instance, wall or ceiling assembles.

However, it has been discovered that under high temperature conditions, such as when the panel is exposed to flame and heat, the glass fiber loses its strength with an increase of the temperature. When the temperature goes up to over 1100° F., for instance, the glass fiber softens and melts, losing over 80% of its flexural strength. This can cause fire-resistant panels that include glass fiber to severely sag or even collapse or fall down, causing the panels to fail specified fire rating tests. This is particularly concerning for ceiling boards, though this problem is not limited to ceiling boards.

To provide improved fire resistance as well as improved sag resistance under high temperature, example gypsum panels herein include mineral wool as a sag-resistant material. Mineral wool can, for instance, be provided in place of the glass fiber used in some gypsum panels. Although mineral wool exhibits thermal insulation and fire-resistant properties, mineral wool is not believed to have been used previously in gypsum cores as disclosed herein, e.g., in place of (e.g., substantially or entirely in place of) conventionally used glass fiber, to improve fire and sag resistance in gypsum panels. The mineral wool helps prolong structural integrity of the gypsum board during a fire, even in high temperature conditions.

Example mineral wools include spun or drawn mineral rock materials. The mineral wool may be introduced into the gypsum core either in a dry form, e.g., as part of a dry mixture that is combined with the wet slurry, or into the wet slurry. In embodiments, the mineral wool is included in a ratio of between 0.2% and 3.0% by weight of the stucco, for example in a percentage range having a lower bound of 0.2, 0.6, 1.0, 1.4, 1.8, 2.2, or 2.6, and an upper bound greater than the lower bound of 3.0, 2.6, 2.2, 1.8, 1.4, 1.0, or 0.6.

In some embodiments, the mineral wool can be introduced into a gypsum core in an amount that replaces all or a significant portion of the glass fiber that is conventionally used in the gypsum core of fire-resistant gypsum panels. In some embodiments, a ratio of mineral wool by weight in the gypsum core is at least 1.5 times that of the glass fiber it replaces (e.g., at least 15 g mineral wool to 10 g glass fiber) and in some embodiments at least 2.4× (e.g., at least 24 g mineral wool to 10 g glass fiber). For instance, the ratio by weight of mineral wool to the glass fiber it replaces in the gypsum core may be at least 1.5×, 1.6×, 1.7×, 1.8×, 1.9×, 2.0×, 2.1×, 2.2×, 2.3×, 2.4×, 2.5×, 3.0×, 3.5×, 4.0×, 5.0×, 10.0×, or higher. The mineral wool may replace glass fiber entirely, for instance, so that glass fiber is omitted from the gypsum core.

The gypsum core optionally may further include one or more shrinkage-resistant materials. Materials that are compatible with the other components and do not substantially shrink at high temperatures or expand at high temperatures can be useful as an optional shrinkage-resistant material in the gypsum core. Shrinkage refers to a reduction in the area (e.g., width-length area) of a segment of the gypsum core after the core is heated to a defined temperature over a defined period of time, as disclosed, for instance, in U.S. Pat. No. 3,616,173. Shrinkage resistance or shrink resistance is a measure of the proportion or percentage of the area of the segment of the core that remains after such heating. Most shrinkage-resistant materials increase the melting point of gypsum composite to reduce or to prevent shrinking at high temperatures. By replacing a portion of the stucco with a small amount of these materials, the set gypsum core shrinks much less as compared to a set core without these materials. Shrinkage-resistant materials include clay, and/or silica-rich materials, such as siloxane.

In embodiments, the shrinkage-resistant materials may include intumescent materials. An intumescent material is one that undergoes a chemical or physical change when exposed to heat or flames that causes it to expand. Some minerals, such as perlite or vermiculite, expand like popcorn when water released from their crystals and fissures suddenly expands due to heat. Expandable graphite may also be used as an intumescent material. Perlite and vermiculite are preferred examples of intumescent materials due to their reasonable cost and ready availability. Examples of expandable vermiculite and other intumescent materials are disclosed in U.S. Pat. No. 8,323,785, and in Intl. Pub. WO 2020/256980, which are incorporated by reference herein.

The amount of the shrinkage-resistant material depends on the exact material chosen. When vermiculite is used, for instance, it is preferably used in amounts of about 1.0% to about 20 wt % based on the weight of the stucco, as the amount of material increases.

The gypsum slurry includes water. During manufacture of gypsum articles, the water is present as a liquid. The stucco, the high temperature sag-resistant material including mineral wool, and one or more optional components can be added to the water to form the slurry.

In some embodiments, the water is as pure as practical to reduce side reactions. The presence of certain salts can modify the setting rate of the gypsum as well as the tendency to shrink. Limiting the amount of salts introduced with the water can make it easier to control the set time and the shrinkage in the product.

One or more additives may optionally be included in the gypsum slurry. Example additives include, but are not limited to, accelerators, dispersants, retarders, and strength enhancers.

An example strength enhancer that may be used in example gypsum panels is starches. Starches are carbohydrates containing two types of polysaccharides: linear amylose and branched amylopectin. Starches generally are known in the art to be added to a stucco slurry for binding a resulting gypsum panel core to facing materials described herein and/or to enhance compressive strength of the final product. For instance, since starch contains glucose monomers containing three hydroxy groups, starch can provide multiple sites for hydrogen bonding to gypsum crystals. Nonlimiting strength enhancing starches include hydroxyethylated and/or hydroxypropylated starches.

Starches can be classified as either cooked or uncooked. Uncooked refers to the starches being in granular form. Uncooked starches are cold water insoluble and have a semi-crystalline structure. Starch granules are semicrystalline, e.g., as seen under polarized light, and are insoluble at room temperatures. By contrast, in cooked starches (also referred to as pregelatinized starches), the starch in placed in water and heated (or cooked) so that the crystalline structure of the starch granules melts and dissolves in water (gelatinization). One of ordinary skill in the art will appreciate methods of pregelatinizing raw starch, such as, for example, cooking raw starch in water at temperatures of at least about 185° F. (85° C.) or other methods. "Uncooked" as used herein means that the starch has a degree of gelatinization of less than about 5% (e.g., less than about 3%, or less than about 1%, or about zero) before being added into the stucco slurry. Gelatinization can be determined, e.g., by the disappearance of birefringence under a microscope with a polarized light.

Including starch such as pregelatinized starch in the gypsum slurry can increase the strength of the set and dried gypsum cast (e.g., increased nail pull resistance). Further, it can minimize or avoid the risk of paper delamination under conditions of increased moisture (e.g., with regard to elevated ratios of water to calcined gypsum). Examples of pregelatinized starch include, but are not limited to, PCF 1000 starch, commercially available from Bunge Milling Inc. and AMERIKOR 818 and HQM PREGEL starches, both commercially available from Archer Daniels Midland Company. Other example pregelatinized starches are disclosed in U.S. Pat. Pubs. 2014/0113124A1 and 2015/0010767A1, which are incorporated by references herein.

If included, the starch may be present in any suitable amount. In some embodiments, if included, the starch is added to the stucco slurry such that it is present in an amount of from about 0.1% A to about 20% percent by weight of the stucco, for instance within a percentage range having a lower bound of 0.1, 0.5, 1.0, 2.0, 3.0, 4.0, 5.0, 6.0, 7.0, 8.0, 9.0, 10.0, 11.0, 12.0, 13.0, 14.0, 15.0, 16.0, 17.0, 18.0, or 19.0, and an upper bound of 20.0, 19.0, 18.0, 17.0, 16.0, 15.0, 14.0, 13.0, 12.0, 11.0, 10.0, 9.0, 8.0, 7.0, 6.0, 5.0, 4.0, 3.0, 2.0, 1.0, or 0.5.

Some uncooked starches can be provided, for instance, by wet milling. Example uncooked starches include cereal starches, root starches, and tuber starches, such as but not limited to corn starch, wheat starch (e.g., A type, B type), pea starch, tapioca starch, or potato starch. Starches may be native starches, chemically modified (e.g., acid-modified) starches, substituted starches having substituted groups, or a combination.

Set retarders or accelerators may optionally be added to modify the rate at which hydration takes place. For instance, set accelerators, e.g., wet gypsum accelerator, heat resistant accelerators, climate stabilized accelerators, etc., may be provided in the stucco slurry in amounts such as between about 0.1% and about 10% by weight of the dry stucco.

An example gypsum set accelerator includes 95% calcium sulfate dihydrate co-ground with 5% sugar and heated to 250° F. (121° C.) to caramelize the sugar and can be made according to U.S. Pat. No. 3,573,947, herein incorporated by reference. Another example gypsum set accelerator is calcium sulfate dihydrate freshly ground with sugar or dextrose at a ratio of about 2.5 to 7.5 pounds of sugar per 100 pounds of calcium sulfate dihydrate and can be made according to U.S. Pat. No. 2,078,199, herein incorporated by reference. The use of any gypsum set accelerator, or combination thereof, in appropriate amounts is contemplated for use in embodiments.

Salts and organic compounds can optionally be included as retarders to modify a set time of a slurry, retarding gypsum hydration. Example retarders include a 1% solution of pentasodium salt of diethylenetriaminepentaacetic acid (e.g., Versanex™80, commercially available from Dow Chemical Company, Midland, Michigan). Some example retarders are disclosed in U.S. Pat. Nos. 3,573,947 and 6,409,825. The retarder may be added to the stucco slurry, as a nonlimiting example, in an amount on a solid basis of about 0.1% to about 10% by weight based on the dry weight of the stucco.

Dispersants or surfactants may optionally be included to modify the viscosity or surface properties of the slurry. For example, the stucco slurry may optionally include a water reducing agent or dispersant that enhances the fluidity of the slurry and makes it flowable when less water is added. Naphthalene sulfonates, melamine compounds, and polycarbonates are example water reducing agents that may be included in the slurry. In some embodiments, at least 0.5% dispersant is used. Dispersants may be added in dry form (any may be combined with other dry ingredients) or liquid form (and may be combined with other liquid ingredients). Where the water reducing agent is added in the form of a liquid, amounts can be calculated based on the dry solids weight.

Naphthalene sulfonates, for instance, may be used with molecular weights in the range of about 3,000 to about 27,000 Daltons. Example water reducing agents include Coatex (Arkema), DILOFLO GW (GEO Specialty Chemical, Lafayette, IN), and EthaCryl 6-3070 (Lyondell Chemical Co., Houston, TX). Example polycarbonates include those having a comb structure with polyalkyl ethers, such as MELFLUX 1641, 2641, or 2651F dispersants, which are products of BASF Construction Polymers, GmbH (Trostberg, Germany) and are supplied by BASF (Kennesaw, Ga.). Other example dispersants include lignosulfonates (water-soluble anionic polyelectrolyte polymers), such as Marasperse C-21 (Reed Lignin, Inc.).

Water reducing agents or dispersants may be provided in the stucco slurry in amounts such as, as nonlimiting examples, between about 0.01% and about 2% by weight of the stucco, and in some examples between about 0.05% and about 1.0% by dry weight of the stucco.

Strength-enhancing agents may optionally be included to promote green (wet) strength, dry strength, and/or dimensional stability. Example strength-enhancing agents may include, for instance, organic acids. An example strength-enhancing agent is a trimetaphosphate compound, an ammonium phosphate having 500-3000 repeating units, and a tetrametaphosphate compound, including salts or anionic portions of any of these compounds. Some example strength-enhancing agents are disclosed in U.S. Pat. Nos. 6,342,284, 6,632,550, 6,815,049, and 6,822,033, herein incorporated by reference. Exemplary trimetaphosphate salts include sodium, potassium or lithium salts of trimetaphosphate, such as those available from Astaris, LLC., St. Louis, MO. Boric acids, tartaric acids and combinations thereof also can be used as strength-enhancing agents.

In some embodiments, a strength-enhancing agent optionally includes sodium trimetaphosphate (STMP). Strength-enhancing agents such as STMP are useful for ceiling boards, for instance, as it helps to bind the structure and reduce sag, though they may be used in other gypsum panels. However, STMP or other strength-enhancing agents are not required.

The strength-enhancing agent can be used in any suitable amount, for example, up to about 1% A, up to about 0.3%, or from about 0.004% to about 2% by weight based on the dry weight of the ingredients, or from between about 0.01% and about 0.5% by dry weight of the stucco.

The stucco or gypsum slurry may be formed, for instance, inside a mixer such as but not limited to a pin or pinless main mixer during a manufacturing process. However, the mode of introduction of ingredients into the mixer may vary. For example, various combinations of components may be pre-mixed before entering the mixer, e.g., one or more dry ingredients and/or one or more wet ingredients may be pre-mixed. By "added to" or "included in" it will be understood that ingredients may be pre-mixed in any suitable manner prior to entry into the mixer where the stucco slurry is formed as set forth herein. A mixer can be embodied in one or multiple mixers, and references herein to a mixer can likewise refer to multiple mixers.

The stucco slurry includes the calcium sulfate hemihydrate (stucco), water, high-temperature sag resistant material including mineral wool, and optionally one or more additional components as provided herein. Stucco may be added to the stucco slurry in an amount that is, as a nonlimiting example, between about 80% and about 90% by weight of the total solids in the stucco slurry.

To form the stucco slurry, a dry mixture of the dry ingredients may be combined including calcium sulfate hemihydrate (stucco), the high-temperature sag-resistant material (including mineral wool), and optionally one or more additional dry ingredients, examples of which are disclosed herein. As a nonlimiting example, strength-enhancing agents such as STMP may optionally be included.

The dry components may be added in a slurry mixer to water and/or to a wet mixture including water and one or more optional wet ingredients to obtain the stucco slurry. Wet ingredients, if present, may be added directly to the water. For instance, water may be provided in an example stucco slurry in a water to solid ratio (by weight) between about 0.30 and about 1.50. For instance, the water to solid ratio may have a lower bound that is at least about 0.30, 0.35, 0.40, 0.45, 0.50, 0.55, 0.60, 0.65, 0.70, 0.75, 0.80, 0.85, 0.90, 0.95, 1.00, 1.05, 1.10, 1.15, 1.20, 1.25, 1.30, 1.35, 1.40, 1.45, or 1.50, in combination with an upper bound that is greater than the lower bound and at most about 1.50, 1.45, 1.40, 1.35, 1.30, 1.25, 1.20, 1.15, 1.10, 1.05, 1.00, 0.95, 0.90, 0.85, 0.80, 0.75, 0.70, 0.65, 0.60, 0.55, 0.50, 0.45, 0.40, or 0.35. The dry and wet components can be mixed, and/or dispensed, in a continuous fashion, Sufficient water can be added to make a flowable slurry. An example water-to-solid ratio for hydrating the calcined gypsum can be determined based on the weight of the water compared to the weight of the total solids in the formulation. An optimal amount of water may also be determined, at least in part, by the type of calcined gypsum that is used. For instance, alpha-calcined stucco uses less water to achieve the same flowability as beta-calcined stucco. A water to solid ratio in an example stucco slurry ranges from about 0.6:1 to about 1.2:1. If the calcined gypsum is primarily a beta hemihydrate, the water to solid ratio may be, for example, from about 0.7:1 to about 2:1, and in some examples from about 0.9:1 to 1.5:1.

In some embodiments, the dry components (e.g., all or a portion of the dry components) can be blended in a mixer, e.g., a powder mixer, to provide a dry mixture prior to addition to the water or wet mixture. All or a portion of the liquid ingredients, if any, can be added directly to the water or wet mixture before, during, or after addition of the dry components. For example, the liquid ingredients can be added to the water to form a wet mixture, which can then be combined with the dry mixture in the slurry mixer to provide the stucco slurry. As another example, water may be combined with the dry mixture, and during or after combining with the water, the liquid ingredients can be added in the slurry mixer to provide the stucco slurry. In other embodiments, one or more dry ingredients other than stucco may be distributed over the dry stucco as it moves along a conveyor.

The process water may affect the properties of both the slurry and the set gypsum matrix. Salts and organic compounds are well known to modify the set time of the slurry, varying widely from accelerating to retarding gypsum hydration. Some impurities lead to irregularities in the structure as the interlocking matrix of dihydrate crystals forms, reducing the strength of the set product. Good quality water without contamination can be used to improve product strength and consistency. However, lower-quality water, such as but not limited to tap water, can also be used, and high-salt gypsum boards may be provided in embodiments.

Aqueous foam can optionally be added, e.g., to the liquid stucco slurry, to provide an air-foamed stucco slurry. Air bubbles in the aqueous foam reduce the density of the set gypsum core. The aqueous foam can be provided by combining a foaming agent with water and air. For instance, the foaming agent, water, and air can be combined in a foam mixing apparatus, such as a foam generator.

In some embodiments, an aqueous foam may be generated separately, e.g., pre-generated, by combining a foaming agent with water and air, for instance in a foam generator, and then the aqueous foam can be combined with the stucco slurry downstream of the slurry mixer, e.g., at a discharge of the slurry mixer. For instance, aqueous foam can be added to, e.g., injected into, the stucco slurry as it exits (discharges from) the slurry mixer or thereafter to provide fluidity to the mix. In other embodiments, the aqueous foam can be combined in situ. For instance, the foaming agent can be added to the stucco slurry in the slurry mixer, where high shear agitation or mixing generates bubbles. Example methods for combining stucco slurries with aqueous foam are disclosed in U.S. Pat. Nos. 5,643,510, 6,494,609, and 7,851,057, each of which is incorporated by reference herein. Other methods for combining stucco slurries with aqueous foam may be used, as will be appreciated by those of ordinary skill in the art.

Conventional foaming agents known to be useful in gypsum products may be added to the aqueous foam. An example foaming agent is a surfactant such as stable soap. Other surfactants such as unstable soaps can be added to the aqueous foam in addition to the stable soap. Example foaming agents include alkyl ether sulfates and sodium laureth sulfates, such as STEOL® CS-230 (Stepan Chemical, Northfield, IL), foaming agents, such as but not limited to the HYONIC line (e.g., 25AS) of soap products, available commercially from GEO Specialty Chemicals in Ambler, PA, POLYSTEP B25 (Stepan Company, Northfield, Ill.), and others disclosed in, for example, U.S. Pat. Nos. 4,676,835; 5,158,612; 5,240,639; and 5,643,510, 5,683,635, as well as in PCT Intl. Pub. WO 95/16515 (Jun. 22, 1995).

The foaming agent can be added to the aqueous foam in an amount sufficient to obtain a desired density in the set gypsum core. For example, the foaming agent may be present in amounts of about 0.003% to about 2.0%, and in some examples from about 0.005% to about 1.5% by weight, based on the weight of the dry stucco.

Optionally, a foam stabilizer may be added to the air-foamed stucco slurry in a suitable amount. Example foam stabilizers are disclosed in U.S. Pat. No. 7,851,057, which is incorporated by reference herein.

The foaming agent and the water can be combined (e.g., mixed) to provide a foaming agent solution in the aqueous foam. For example, an example aqueous foam can include a foaming agent solution having a foaming agent concentration of, as a nonlimiting example, between about 0.5% and about 2.5% by weight. Some example foaming agent solutions include a 1% soap solution (stable soap, unstable soap, or a combination of stable and unstable soap). A combination of stable soap and unstable soap, for instance, can be used to control the amount of air added and the size of the air bubbles. The water in the foaming agent solution may be any suitable water, e.g., filtered water, tap water, etc. In some embodiments, the combined water in the air-foamed slurry, including the water from the stucco slurry and the additional water in the foaming agent solution, can be provided in a water to stucco ratio between about 60% and about 150% by weight. For instance, the water to stucco ratio (by weight) may have a lower bound that is at least about 60%, 70%, 80%, 90%, 100%, 110%, 120%, 130%, or 140%, in combination with an upper bound that is greater than the lower bound and at most about 150%, 140%, 130%, 120%, 110%, 100%, 90%, 80%, or 70%.

To provide air-foaming with stable air bubbles, an example aqueous foam includes a mixture of air and the foaming agent solution, such as but not limited to a stable soap solution. The air rate and flow rate can be selected to provide an optimal air bubble size and air bubble proportion in the air-foamed stucco slurry. The air rate and/or flow rate can be adjusted according to a target core density, as will be appreciated by those of ordinary skill in the art. The amount and/or type of foaming agent used can affect how much air is incorporated into the set gypsum core.

In some example methods, no additional mixing is necessary after foam addition. For instance, the foam and slurry can mix sufficiently as it moves, e.g., through one or more hoses and conduits, to a forming table.

As shown by example in the gypsum panel 10, gypsum panels may optionally include one or more facing materials coupled to the gypsum core to support the gypsum layer during manufacture by transferring stresses across the facing material, especially while the gypsum panel is wet. The facing materials may cover (partially or entirely) one or more long surfaces (faces and/or edges) of the gypsum core.

The facing material can include a front facing material and/or a back facing material. Example facing materials for the front and back facing materials include glass mat and paper. In some embodiments the front and back facing material is glass mat. In other embodiments the front and back facing material is paper. For instance, the front facing material can be manila paper and the back facing material can be Newsline paper.

The facing material if any may be optionally placed on the outside of the gypsum core layer (and over any additional layers, if provided) on or over one or more faces and/or one or more of the edges of the gypsum panel. Use of facing material can increase the flexural strength of the gypsum panel.

The gypsum panel may further include one or more additional layers, such as but not limited to a skim coat, a densified layer, a concentrated layer, or other enhanced layer. The additional layer, if provided, can be positioned between the gypsum core and the facing material if any. In some embodiments, the additional layer(s) include(s) set gypsum and one or more additives, one or more of which may be provided in greater concentrations that those in the gypsum core. Example concentrated layers are disclosed in U.S. patent application Ser. Nos. 15/186,176; 15/186,212; 15/186,232; and 15/186,257.

If additional layers are provided in the gypsum panel, it is contemplated that the gypsum slurry may be divided into at least two portions, e.g., a primary and secondary portion, as the slurry is discharged from the mixer, e.g., as it exits or immediately after the exit. The aqueous foam may then be pumped into at least one of the slurry streams, e.g., a primary portion that will form the gypsum core, and the slurry and the foam stream can then be moved downstream to become the gypsum core. Another slurry stream can then be used to prepare the additional layer(s). Nonlimiting examples of additional layers and coatings are disclosed in PCT Application PCT/US2020/036608 (Intl. Pub. No. WO 2020/256980A1), incorporated by reference herein.

The prepared air-foamed gypsum slurry can be formed into a (e.g., gypsum precursor or precursor) core using a molding or casting process. For example, after the aqueous foam is added to the slurry (or at least a portion thereof) to provide the air-foamed slurry, the air-foamed slurry can be discharged to a moving conveyor, either directly onto the conveyor surface or onto an optional facing material to provide a gypsum panel. Example board manufacturing methods are disclosed in U.S. Pat. No. 7,364,676 and U.S. Pat. App. Pub. 2010/0247937, which are incorporated herein by reference.

The provided air-foamed slurry can alternatively or additionally be discharged, e.g., poured, into a mold or otherwise between and/or onto one or more surfaces. The mold or surfaces may be sized and arranged based on the desired configuration. Any suitable molding or casting process known for forming gypsum molds or gypsum panels may be used, examples of which will be apparent to those of ordinary skill in the art.

The stucco core sets (hydrates) to provide a set gypsum core including an interlocking matrix of set gypsum. For instance, the precursor stucco core can be maintained under conditions that are sufficient for the calcined gypsum in the slurry to hydrate, curing or hardening to form an interlocking matrix of set calcium sulfate dihydrate in the set gypsum core.

The drying temperature may be at least about 170° F. but less than or equal to about 550° F., and in some embodiments the heating temperature may be between about 350° F. and about 450° F. For instance, the heating temperature may have a lower bound that is at least about 170° F., 180° F., 190° F., 200° F., 210° F., 220° F., 230° F., 240° F., 250° F., 260° F., 270° F., 280° F., 290° F., 300° F., 310° F., 320° F., 330° F., 340° F., 350° F., 360° F., 370° F., 380° F., 390° F., 400° F., 410° F., 420° F., 430° F., 440° F., 450° F., 460° F., 470° F., 480° F., 490° F., 500° F., 510° F., 520° F., 530° F., or 540° F., in combination with an upper bound that is greater than the lower bound and at most about 550° F., 540° F., 530° F., 520° F., 510° F., 500° F., 490° F., 480° F., 470° F., 460° F., 450° F., 440° F., 430° F., 420° F., 410° F., 390° F., 380° F., 370° F., 360° F., 350° F., 340° F., 330° F., 320° F., 310° F., 300° F., 290° F., 280° F., 270° F., 260° F., 250° F., 240° F., 230° F., 220° F., 210° F., 200° F., 190° F., or 180° F.

Drying may take place in a single stage or in multiple stages, each of which may occur at heating temperatures in the ranges disclosed above. If multiple heating stages are used, an example heating may include a first heating at a first heating temperature between 350° F. and 450° F., and a second heating at a second heating temperature, which optionally may be a lower temperature than the first temperature, e.g., between 300° F. and 400° F. The amount of heating time (single stage or multiple stages) can be determined based on, for instance, the heating temperature, the size/weight of the set gypsum matrix, and/or the amount of excessive water.

Example methods for making a fire-resistant gypsum panel can be a batch process, while in other embodiments the method may be an individual process. In an example forming method, an air-foamed slurry is prepared as described above. In some example methods, one or more optional liquid materials, e.g., dispersant, retarder, strength-enhancing agents, etc., may be pre-mixed in, for instance, a slurry mixer with water to provide a wet mixture and then combined with the dry mixture, e.g., including stucco, mineral wool, and optional dry materials such as set accelerators, etc., prepared in, for instance, a powder mixer, to provide the stucco slurry. The aqueous foam, e.g., from a combination (e.g., mixture) of water, air, and the foaming agent, can be pregenerated, e.g., in a foam generator, and added to the slurry, e.g., at the discharge of the mixer, to provide an air-foamed slurry. The mixing time for the stucco slurry and the air-foamed slurry should be sufficient to yield a uniform slurry, but less than the set time of the slurry.

In other methods, the wet mixture can be mixed with the aqueous foam (pregenerated or mixed in situ) to form a process solution. The process solution can then be combined with the dry mixture to provide the air-foamed slurry. In both examples, the mixing time to provide the air-foamed slurry should be sufficient to yield a uniform slurry, but less than the set time of the slurry.

A continuous strip of the air-foamed slurry may be formed. For example, the wet slurry mixture may be dispersed, e.g., poured, from the mixer containing the wet slurry mixture (e.g., a slurry mixer), combined with the aqueous foam to form the air-foamed slurry, and the air-foamed slurry may then be spread evenly onto a facing material that is positioned to receive the slurry. This continuous strip can form the gypsum core layer when set. Additional layers may be added.

Facing material, if used, may be positioned on the conveyor belt to receive the gypsum slurry. From the slurry mixer, the slurry can be transferred to the facing material using a flexible conduit. The gypsum slurry may be made sufficiently fluid so that it will spread over the surface of the facing material with little or no spreading necessary. If a facing material is applied to another face, it may be applied next while the gypsum slurry is still fluid, sandwiching the slurry between the two facing materials. The gypsum core, and any optional covering materials, if present, can then pass under a forming bar to make the gypsum core a uniform thickness.

If an optional additional layer such as a densified layer is to be provided, the stucco slurry may be divided into a main stream and a slip stream, and then both the stucco slurry in the main stream and the slip stream can be combined with the aqueous foam, or alternatively one or more of the additional layers may be kept separate from or otherwise not combined with the aqueous foam.

The gypsum in the air-foamed slurry material is allowed to set, as explained above, to provide an interlocking matrix of set gypsum. When the gypsum core has set sufficiently to achieve desired green strength to be easily handled, the gypsum product can be cut. Alternatively or additionally, the gypsum product may be cut after drying. The gypsum product (e.g., the gypsum panel) can be cut to a desirable size. Sizes can vary as needed. Nonlimiting example areas for the cut panels can be m×n, where m is any width between about 4 ft and about 5.4 ft, and n is any length between about 8 ft and about 12 ft. A nonlimiting example size for the dried gypsum panel is about 4 ft x 12 ft. Nonlimiting example thicknesses for the dried gypsum panel are between about 0.5 inches and about 1.0 inches.

To remove additional excess water if needed, the gypsum product, including the (e.g., set or at least partially set) gypsum matrix, may be dried at a drying temperature. For instance, the gypsum product may be transferred (e.g., using a conveyor) to a heater such as but not limited to a kiln for heating and drying. The kiln may optionally include multiple zones to achieve selected heating and drying conditions. Alternatively, multiple heaters and dryers may be used, e.g., in series, with the gypsum product being transferred among the multiple heaters/dryers.

The resulting gypsum product can be embodied in, for instance, ceiling panels such as ceiling boards or other gypsum panels (e.g., wall panels (such as but not limited to wallboards) or other surface panels). Ceiling panels such as ceiling boards can be applied to a ceiling using methods known to those of ordinary skill in the art, such as but not limited to methods used for installing wallboard or other surface boards in or on ceilings. Similarly, wall panels or other surface panels can be applied to a wall or other surface using methods known to those of ordinary skill in the art.

Experiments

Gypsum boards (Type ULIX and Type X ("TX") boards) having glass fiber (GF) or mineral wool (ML) as a fire-resistant reinforcement material were prepared according to the example formulations provided in Table 1, 3, 5, and 7 below. For the glass fiber added boards (GF-ULIX; GF-TX), the glass fiber was mixed with the other dry powders. The dry powders soaked in the liquid solution for 10 seconds and were blended for 10 seconds in a Hobart mixer, followed by injecting foam for 13 seconds (GF-ULIX) or 7 seconds (GF-TX) and mixing for another 2 seconds. The slurry was poured into a 12" by 13" by 5/8" envelop.

For the mineral wool added boards (MWP-ULIX; MWP-TX), the mineral wool was added in the wet slurry form. 5% of mineral wool slurry was prepared by mixing the mineral wool with water in a Waring blender for 5 seconds. Dry powders and the mineral wool slurry were soaked in the solution for 10 seconds and blended for 10 seconds, followed by injecting the foam for 13 seconds (GF-ULIX) or 7 seconds (GF-TX) and mixing for another 2 seconds. The slurry was poured into a 12" by 13" by 5/8" envelop.

After the slurries were set and hardened, the envelop was sealed using paper tape. The sealed board was dried at 450° F. for 15 minutes, then moved to 360° F. After being dried at 360° F. for 15 minutes, the board further dried at 110° F. overnight.

The sample boards were tested for high-temperature sag according to the following procedure:

10"×1.5"×5/8" stripes were cut from the casted boards.

The samples were placed in a furnace on bricks (2.5" high) spaced 8" apart in the middle of the heated space.

The furnace was heated from ambient temperature to 1600° F. (this took about 75 min), then remained at 1600° F. for 15 mins. Total heating time was 90 min.

Sag performance was observed every 30 minutes after 30 min heating.

High-temperature sag was measured.

EXAMPLE 1

To compare glass fiber and mineral wool boards, GF-ULUIX, MW-ULIX, GF-Type X, and MW-Type X boards were prepared and casted according to the example formulations provided in Table 1 below.

TABLE 1

Formulation for Type ULIX and Type X Boards

| Sample ID | Type ULIX | | Type X | |
| --- | --- | --- | --- | --- |
| | GF-ULIX | MWP-ULIX | GF-TX | MWP-TX |
| Thickness | 5/8" | 5/8" | 5/8" | 5/8" |
| Stucco (g) | 900 | 900 | 900 | 900 |
| HRA (g) | 9 | 9 | 9 | 9 |
| USG15 (g) | 5 | 5 | 2 | 2 |
| Fiber Glass (g) | 4.65 | 0 | 2.8 | 0 |
| Grade 4 Vermiculite (g) | 31 | 31 | 0 | 0 |
| Mineral Wool (g) | 0 | 11.2 | 0 | 8.4 |
| 10% STMP (g) | 3 | 3 | 3 | 3 |
| Retarder 1% (g) | 12 | 12 | 12 | 12 |
| Dispersant (g) | 3 | 3 | 3 | 3 |
| Water (g) | 870 | 870 | 870 | 870 |
| Air flow (L/min) | 40 | 40 | 40 | 40 |
| Soap flow (L/min) | 5 | 5 | 5 | 5 |
| Foam time (sec) | 13 | 13 | 7 | 7 |

Table 2 summarizes the thermal performance of the casted boards. For Type ULIX boards, MW-ULIX showed a similar thermal shrinkage as GF-ULIX, but its high-temperature sag was 14/16", which was lower than GF-ULIX (1 2/16") (22.2% lower sag). For Type X boards, MW-Type X showed a similar thermal shrinkage as GF-Type X, but its high-temperature sag was 11/16", much lower than GF-Type X (1 9/16") (56% lower sag). The GF-Type X sample fell during the high-temperature sag test.

TABLE 2

Thermal Shrinkage and High-Temperature Sag for Type ULIX and Type X

| Sample | Type ULIX | | Type X | |
| --- | --- | --- | --- | --- |
| | GF | MW | GF | MW |
| Thermal shrinkage X-Y % | 4.58 ± 0.41 | 4.64 ± 0.15 | 5.28 ± 0.25 | 5.22 ± 0.32 |
| Thermal shrinkage Z % | 5.86 ± 0.47 | 7.31 ± 0.28 | 10.71 ± 0.14 | 10.68 ± 0.71 |
| High-Temp Sag (") | 1 2/16" | 14/16" | 1 9/16"(fell) | 11/16" |
| Board Weight (#/msf) | 1819 | 1823 | 2104 | 2098 |

EXAMPLE 2

High salt boards including glass fiber and mineral wool were prepared by following the example formulation in Table 3 below. Chloride was from a mixture of sodium chloride and magnesium chloride. The total chloride concentration in the high salt boards (GF-1000ppm; MW-1000ppm) was 1000ppm to stucco.

TABLE 3

Formula for low salt and high salt boards

| Sample ID | GF | GF-1000 ppm | MW-1000 ppm |
|---|---|---|---|
| Thickness | 5/8" | 5/8" | 5/8" |
| Stucco (g) | 900 | 900 | 900 |
| HRA (g) | 9 | 9 | 9 |
| USG15 (g) | 5 | 5 | 5 |
| Fiber Glass (g) | 4.65 | 4.65 | 0 |
| Grade 4 Vermiculite (g) | 31 | 31 | 31 |
| Mineral Wool (g) | 0 | 0 | 11.2 |
| NaCl (g) | 0 | 0.62 | 0.62 |
| MgCl2 (g) | 0 | 0.60 | 0.60 |
| Clay (g) | 0 | 11 | 11 |
| 10% STMP (g) | 3 | 3 | 3 |
| Retarder 1% (g) | 12 | 12 | 12 |
| Dispersant (g) | 3 | 3 | 3 |
| Water (g) | 870 | 870 | 870 |
| Airflow (L/min) | 40 | 40 | 40 |
| Soap flow (L/min) | 5 | 5 | 5 |
| Foam time (sec) | 13 | 13 | 13 |

Table 4 summarizes the thermal performance from the GF-based and MW-based high salt boards. As with the low salt GF-based board, the MW-1000ppm board showed a similar thermal shrinkage as the GF-1000ppm board, but it had a much better high-temperature sag resistance, 1 2/16" (MW-1000ppm) vs. 2 6/16" (GF-1000ppm) (52.6% lower sag). The GF-1000ppm board fell during the high-temperature sag test.

TABLE 4

Thermal Shrinkage and High-Temperature Sag from high salt boards

| 1000 ppm high salt Type ULIX board | GF | GF-1000 ppm | MW-1000 ppm |
|---|---|---|---|
| Thermal shrinkage X-Y % | 4.21 ± 0.43 | 4.58 ± 0.09 | 4.65 ± 0.46 |
| Thermal shrinkage Z % | 5.94 ± 0.78 | 5.71 ± 0.11 | 6.02 ± 0.33 |
| High-Temp Sag (") | 1 3/16" | 2 6/16" (fell) | 1 2/16" |
| Board Weight (#/msf) | 1838 | 1825 | 1812 |

EXAMPLE 3

MW-added Type ULIX boards having varying amounts of MW were prepared, as shown in the example formulation in Table 5 below.

TABLE 5

Formula for Type ULIX boards having a different amount of MW

| Sample ID | GF | MWP (2.4x) | MWP (2.0x) | MWP (1.6x) |
|---|---|---|---|---|
| Thickness | 5/8" | 5/8" | 5/8" | 5/8" |
| Stucco (g) | 900 | 900 | 900 | 900 |
| HRA (g) | 9 | 9 | 9 | 9 |
| USG15 (g) | 5 | 5 | 5 | 5 |
| Fiber Glass (g) | 4.65 | 0 | 0 | 0 |
| Grade 5 Vermiculite (g) | 31 | 31 | 31 | 31 |
| Mineral Wool (g) | 0 | 11.2 | 9.3 | 7.4 |
| 10% STMP (g) | 3 | 3 | 3 | 3 |
| Retarder 1% (g) | 12 | 12 | 9 | 9 |
| Dispersant (g) | 3 | 3 | 3 | 3 |
| Water (g) | 870 | 870 | 855 | 855 |
| Air flow (L/min) | 40 | 40 | 40 | 40 |
| Soap flow (L/min) | 5 | 5 | 5 | 5 |
| Foam time (sec) | 13 | 13 | 7 | 7 |
| MW:GF | | 2.4:1 | 2:1 | 1.6:1 |

Table 6 summarizes the thermal performance from the MW added boards. Overall, the MW-added boards provided a similar thermal shrinkage as the GF-added board, but their high-temperature sag was much lower than the GF-added board (11/16"~15/16" vs. 1 4/16"). When decreasing the amount of MW, the high-temperature sag performance slightly decreased.

TABLE 6

Thermal Shrinkage and High-Temperature Sag from high salt boards

| Sample | GF | MWP (2.4x) | MWP (2.0x) | MWP (1.6x) |
|---|---|---|---|---|
| Thermal shrinkage X-Y % | 4.59 ± 0.37 | 4.55 ± 0.13 | 4.78 ± 0.19 | 4.72 ± 0.45 |
| Thermal shrinkage Z % | 8.16 ± 0.37 | 8.92 ± 0.11 | 8.66 ± 0.14 | 8.80 ± 0.74 |
| High-Temp Sag (") | 1 4/16" | 11/16" | 13/16" | 15/16" |
| Board Weight (#/msf) | 1884 | 1871 | 1852 | 1866 |

The above experiments demonstrated surprisingly that replacing glass fiber with mineral wool to provide a high temperature sag-resistant material resulted in significantly improved high temperature sag resistance, while providing comparable thermal shrinkage. Similar benefits were demonstrated for low salt and high salt (e.g., 1000 ppm chloride to stucco) gypsum boards.

Embodiments disclosed herein provide, among other things, a fire-resistant gypsum panel comprising a gypsum core layer comprising set gypsum and a high temperature sag-resistant material including mineral wool in an amount of between 0.2% and 3.0% by weight of stucco. In addition to any of the above features in this paragraph, the fire-resistant gypsum panel may further comprise a facing material. In addition to any of the above features in this paragraph, the gypsum core may further comprise a shrinkage-resistant material. In addition to any of the above features in this paragraph, the shrinkage-resistant material may comprise one or more intumescent materials. In addition to any of the above features in this paragraph, the intumescent materials may comprise vermiculite. In addition to any of the above features in this paragraph, the gypsum core may further comprise a strength-enhancing agent. In addition to any of the above features in this paragraph, the strength-enhancing agent may comprise trimetaphosphate. In addition to any of the above features in this paragraph, the strength-enhancing agent may comprise sodium trimetaphosphate (STMP). In addition to any of the above features in this paragraph, the gypsum may comprise calcium sulfate dihydrate. In addition to any of the above features in this paragraph, the gypsum core may further comprise one or more of a binder, a set accelerator, a dispersant, a set retarder, or a reinforcing fiber. In addition to any of the above features in this paragraph, the gypsum core may have a high salt concentration. In addition to any of the above features in this paragraph, the gypsum core may omit (not include), glass fiber. In addition to any of the above features in this paragraph, the fire-resistant panel may further comprise: a densified layer disposed on at least one long surface of the gypsum core layer; and a facing material disposed on and the densified layer. In addition to any of the above features in this paragraph, the facing material may comprise paper and/or glass mat. In addition to any of the above features in this paragraph, the set gypsum core may have a density between about 15 pcf and about 60 pcf. In addition to any of the above features in this paragraph, the fire-resistant gypsum panel has a high temperature sag reduction of at least 10% compared to a gypsum panel that includes glass fiber in place of the high temperature sag-resistant material but is otherwise configured the same or similarly. In addition to any of the above features in this paragraph, the gypsum panel may comprise ceiling board. In addition to any of the above features in this paragraph, the gypsum panel may comprise wallboard or surface board.

Additional embodiments disclosed herein provide, among other things, a set gypsum core for a fire-resistant panel comprising set gypsum; and a high temperature sag-resistant material including mineral wool in an amount between 0.2% and 3.0% by weight of the stucco. In addition to any of the above features in this paragraph, the set gypsum core may further comprise a shrinkage-resistant material. In addition to any of the above features in this paragraph, the gypsum core may omit (not include) glass fiber. In addition to any of the above features in this paragraph, the fire-resistant panel may be a ceiling board. In addition to any of the above features in this paragraph, the fire-resistant panel including the set gypsum core has a high temperature sag reduction of at least 10% compared to a gypsum panel that includes glass fiber in place of the high temperature sag-resistant material but is otherwise configured the same or similarly.

Additional embodiments disclosed herein provide, among other things, a composition for forming a fire-resistant gypsum core for a fire-resistant panel comprising water stucco, and a high temperature sag-resistant material including mineral wool in an amount between 0.2% and 3.0% by weight of the stucco. In addition to any of the above features in this paragraph, the composition may further comprise a shrinkage-resistant material. In addition to any of the above features in this paragraph, the composition may further comprise a strength-enhancing agent. In addition to any of the above features in this paragraph, the composition may omit (not include) glass fiber. In addition to any of the above features in this paragraph, the fire-resistant panel may be a ceiling board.

Additional embodiments disclosed herein provide, among other things, a method for making a fire-resistant gypsum panel comprising: preparing a slurry comprising water, stucco, and a high temperature sag-resistant material including mineral wool in an amount between 0.2% and 3.0% by weight of the stucco; combining the prepared slurry with aqueous foam to provide an air-foamed slurry; forming a gypsum core from the air-foamed slurry; allowing the formed gypsum core to set; and drying the set gypsum core. In addition to any of the above features in this paragraph, the slurry may further comprise a shrinkage-resistant material. In addition to any of the above features in this paragraph, forming a gypsum core may further comprise depositing the air-foamed slurry over a facing material. In addition to any of the above features in this paragraph, the method may further comprise providing a facing material over the deposited air-foamed slurry. In addition to any of the above features in this paragraph, the method may further comprise: forming a densified layer on the gypsum core; and providing the facing material over the densified layer. In addition to any of the above features in this paragraph, the method may further comprise: cutting the gypsum core into one or more panels. In addition to any of the above features in this paragraph, the panels may comprise ceiling boards, wallboards, or surface boards. In addition to any of the above features in this paragraph, the panels may comprise ceiling boards. In addition to any of the above features in this paragraph, the fire-resistant gypsum panel including the set gypsum core has a high temperature sag reduction of at least 10% compared to a gypsum panel that includes glass fiber in place of the high temperature sag-resistant material but is otherwise configured the same or similarly.

Additional embodiments disclosed herein provide, among other things, a method for insulating a structure comprising: applying the fire-resistant panel of any of the above embodiments to a ceiling of the structure. In addition to any of the above features in this paragraph, the applied fire-resistant panel may be a ceiling board. In addition to any of the above features in this paragraph, applying may comprise installing the ceiling board in the ceiling.

Additional embodiments disclosed herein provide, among other things, a fire-resistant gypsum panel as described herein.

Additional embodiments disclosed herein provide, among other things, a fire-resistant ceiling board as described herein.

Additional embodiments disclosed herein provide, among other things, a fire-resistant gypsum board as described herein.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. It will be readily understood that the aspects of the present disclosure, as generally described herein, and illustrated in the figures, can be arranged, substituted, combined, separated, and designed in a wide variety of different configurations, all of which are explicitly contemplated herein. In other words, the described embodiments are not mutually exclusive, and permutations of one or more embodiments with one another remain within the scope of this disclosure. Other embodiments may be utilized, and other changes may be made, without departing from the scope of the subject matter presented herein.

Any of the above aspects and embodiments can be combined with any other aspect or embodiment as disclosed here in the Summary, Figures and/or Detailed Description sections, except where such combinations would be infeasible as will be appreciated by an artisan.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and."

Unless specifically stated or obvious from context, as used herein, the term "about" is understood as within a range of normal tolerance in the art, for example within 2 standard deviations of the mean. About can be understood as within 20%, 19%, 18%, 17%, 16%, 15%, 14%, 13%, 12% 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A fire-resistant gypsum panel comprising:
   a gypsum core layer comprising set gypsum and mineral wool in an amount of between greater than 0.9% and less than or equal to and 3.0% by weight of stucco, wherein the mineral wool includes spun or drawn mineral rock material, and wherein the gypsum panel at a temperature of 1600° F. has a sag reduction of at least 10% compared to a gypsum panel that includes glass fiber in place of the mineral wool but is otherwise likewise configured.

2. The gypsum panel of claim 1, further comprising:
   a facing material.

3. The gypsum panel of claim 1, wherein the gypsum core further comprises a shrinkage-resistant material.

4. The gypsum panel of claim 1, wherein the gypsum core further comprises one or more of a starch, a binder, a set accelerator, a dispersant, a set retarder, or a reinforcing fiber.

5. The gypsum panel of claim 1, wherein the gypsum core has a chloride level of 300 ppm or greater.

6. The gypsum panel of claim 1, wherein the gypsum core does not include glass fiber.

7. The gypsum panel of claim 1, wherein the set gypsum core has a density between about 15 pcf and about 60 pcf.

8. The gypsum panel of claim 1, wherein the gypsum panel comprises ceiling board, wallboard, or surface board.

9. A set gypsum core for a gypsum panel comprising:
   a. set gypsum; and
   b. a mineral wool in an amount greater than 0.9% and less than or equal to 3.0% by weight of the stucco, wherein the mineral wool includes spun or drawn mineral rock material,
   wherein the gypsum panel at a temperature of 1600° F. has a sag reduction of at least 10% compared to a gypsum panel that includes glass fiber in place of the mineral wool but is otherwise likewise configured.

10. The set gypsum core of claim 9, further comprising:
    a shrinkage-resistant material.

11. The set gypsum core of claim 9, wherein the gypsum core does not include glass fiber.

12. The set gypsum core of claim 9, wherein the gypsum core has a chloride level of 300 ppm or greater.

13. A composition for forming a gypsum core for a gypsum panel comprising:
    a. water;
    b. stucco; and
    c. mineral wool in an amount greater than 0.9% and less than or equal to and 3.0% by weight of the stucco, wherein the mineral wool includes spun or drawn mineral rock material;
    wherein the gypsum panel at a temperature at 1600° F. has a sag reduction of at least 10% compared to a gypsum panel that includes glass fiber in place of the mineral wool but is otherwise likewise configured.

14. The composition of claim 13, further comprising:
    a shrinkage-resistant material.

15. The composition of claim 13, further comprising:
    a starch.

16. The composition of claim 13, wherein the composition does not include glass fiber.

17. The set gypsum core of claim 16, wherein the gypsum panel is a ceiling board.

18. The composition of claim 13, wherein the gypsum panel is a ceiling board.

19. The composition of claim 13, wherein the gypsum core has a chloride level of 300 ppm or greater.

20. A method for making a gypsum panel comprising:
 a. preparing a slurry comprising water, stucco, and mineral wool in an amount greater than 0.9% and less than or equal to 3.0% by weight of the stucco, and wherein the mineral wool includes spun or drawn mineral rock material;
 b. combining the prepared slurry with aqueous foam to provide an air-foamed slurry;
 c. forming a gypsum core from the air-foamed slurry;
 d. allowing the formed gypsum core to set; and
 e. drying the gypsum core,
 wherein the gypsum panel at a temperature at 1600° F. has a sag reduction of at least 10% compared to a gypsum panel that includes glass fiber in place of the mineral wool but is otherwise likewise configured.

21. The method of claim 20, wherein the slurry further comprises a shrinkage-resistant material.

22. The method of claim 20, wherein said forming a gypsum core comprises depositing the air-foamed slurry over a facing material.

23. The method of claim 20, further comprising:
 providing a facing material over the deposited air-foamed slurry.

24. The method of claim 20, further comprising:
 forming a densified layer on the gypsum core; and
 providing the facing material over the densified layer.

25. The method of claim 20, further comprising:
 cutting the gypsum core into one or more panels.

26. The method of claim 25, wherein the gypsum panels comprise ceiling boards, wallboards, or surface boards.

27. The method of claim 20, further comprising:
 applying the gypsum panel to a ceiling of a structure.

28. The method of claim 20, wherein the gypsum core has a chloride level of 300 ppm or greater.

* * * * *